Nov. 8, 1955     E. L. BAUER     2,723,170
PISTON RING
Filed May 10, 1952
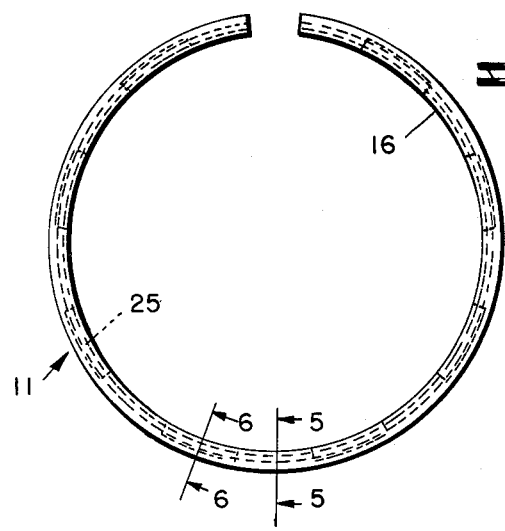
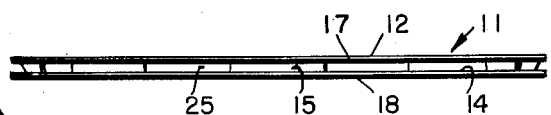
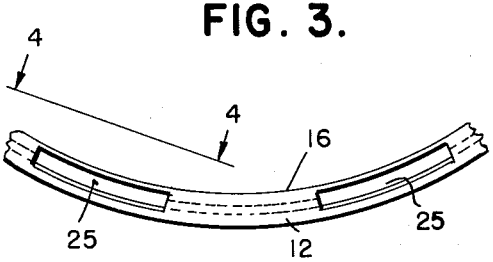
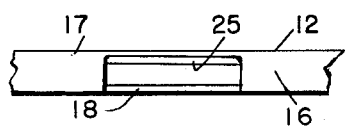
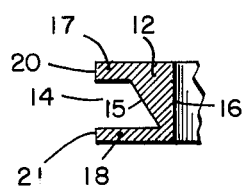
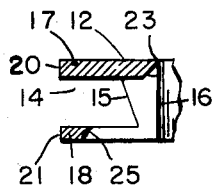
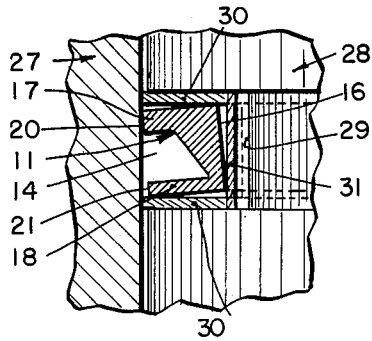
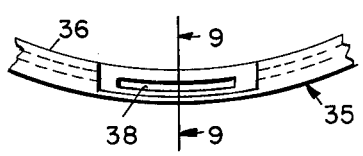
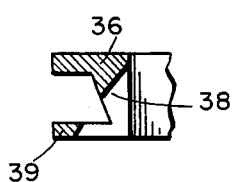
INVENTOR
EDWARD L. BAUER
BY
*Mason & Graham*
ATTORNEYS

United States Patent Office 2,723,170
Patented Nov. 8, 1955

2,723,170
PISTON RING

Edward L. Bauer, Temple City, Calif.

Application May 10, 1952, Serial No. 287,079

9 Claims. (Cl. 309—45)

This invention has to do generally with piston rings and more particularly with oil rings used on the pistons of internal combustion engines.

An object of the invention is to provide a novel and improved oil ring type of piston ring for internal combustion engines.

Present-day high compression engines place relatively great demands upon the oil rings because of the extreme suction developed in the cylinders, particularly at high speeds when the engine is decelerated. This suction tends to draw the oil past the oil rings and into the combustion chamber, with consequent loss of oil and increase in carbon build-up in the cylinder and on the piston and valves. It therefore is an object of my invention to provide an oil ring of novel construction which is particularly designed to prevent escape of oil therepast. In this connection, it is an object to provide an oil ring which is so constructed that, when compressed in installed position, it tends to twist in a manner such that the inner upper edge tends to engage the upper wall of the ring groove (or a ring segment between the upper wall and the oil ring) and the upper peripheral edge of the ring tends to engage the cylinder wall to effect an oil seal.

A further object is to provide a novel oil-type piston ring so constructed as to provide for improved drainage of oil therefrom.

Another object is to provide a piston ring which is easy and economical to fabrciate.

A further object is to provide an oil ring which tends to hold the ring segments stable and one which is adaptable for use either with or without ring segments. In this connection it is also an object to provide such a ring which can be used either with or without an expander.

These and other objects will be apparent from the drawing and the following description.

Referring to the drawing:

Fig. 1 is a plan view of a ring embodying the invention;

Fig. 2 is an elevational view of the ring of Fig. 1 on a larger scale;

Fig. 3 is an enlarged fragmentary bottom plan view of a portion of the ring of Fig. 1;

Fig. 4 is an elevational view on line 4—4 of Fig. 3;

Figs. 5 and 6 are enlarged sectional views on lines 5—5 and 6—6, respectively, of Fig. 1;

Fig. 7 is an enlarged fragmentary, sectional view illustrating a piston wall, a cylinder and a ring on the cylinder;

Fig. 8 is a fragmentary, inverted plan view of a modified form of the invention; and Fig. 9 is a section on line 9—9 of Fig. 8 on a larger scale.

More particularly describing the invention, referring first to Figs. 1–7, inclusive, 11 generally indicates a piston ring which is comprised of a substantially annular, but split, body 12. This body is provided with an external groove 14 the inner boundary of which is an angularly disposed wall 15 which may be defined as being frustroconical in shape. The groove 14 divides the body into an upper flange or rim 17 and a lower flange or rim 18. I preferably form the upper flange 17 of slightly greater thickness than the lower flange. The flanges 17 and 18 have peripheral surfaces 20 and 21 which are concentric with the inner surface 16 of the ring.

With the construction thus far described, when the ring is installed and is compressed by the cylinder wall, there is a certain amount of torsion set up in the ring which tends to twist it in a direction opposite to that in which it is shown in Fig. 7. However, as will later appear, the ring body is relieved at circumferentially spaced regions by oil drainage ports, indicated by 25, which tend to cause the ring to twist in the direction in which it is shown in Fig. 7.

I prefer to form the drainage ports so that they extend through the main body of the ring and also, to some extent, through the lower flange 18 thereof, as best shown in Figs. 3 and 6. This can conveniently be accomplished by milling an opening through the body of the ring between the flanges, and subsequently milling away part of the lower flange and to some extent beveling the inner edge 23 of the upper flange. With this construction, there is ample opportunity for the oil which becomes caught in the groove 14 to drain therefrom through the drainage ports.

As previously indicated, the formation of the drainage ports 25 so that they extend partially through the lower flange 18 of the ring sets up certain torsional stresses in the ring when the same is compressed as when installed in a cylinder, which forces tend to twist the ring in the direction it is shown in Fig. 7. This tendency of the ring to twist as it is shown in Fig. 7 is counteracted to some extent by the cross-sectional shape of the ring body wherein the body is thicker at the top than at the bottom by reason of the angularly disposed wall 15, so that only a desired amount of twist is obtained in the finished product.

Referring to Fig. 7, 27 indicates the cylinder wall, and 28 a piston having a ring groove 29 therein. The ring 11 is shown mounted in the groove with a pair of ring segments 30, one above and the other below the ring. An expander 31 is shown behind the ring and segments. It will be apparent from Fig. 7, in which the twist of the ring has been exaggerated, that the ring twists in a direction such that the inner, upper edge of the ring tends to seat or bear against the upper ring segment and the outer, upper edge of the ring tends to engage the cylinder wall. I have found that this ring tends to prevent migration or escape of oil past the ring behind the ring as well as along the face of the cylinder wall and, at the same time, provides for adequate drainage of any oil which enters the groove 14 of the ring.

While the ring shown in Figs. 1–7 is particularly designed for use with ring segments, I contemplate that the ring may be used alone, in which case it would be made to substantially fill the width of the ring groove.

In Figs. 8 and 9 I show a modified form of ring, indicated by 35, in which the body 36 of the ring has the same general cross-sectional shape as the ring 11 previously described. Here, however, the oil drainage ports 38 are shaped as if formed by a single milling operation which removes metal from the body of the ring 36 and the lower flange portion 39 thereof simultaneously.

Although I have shown and described preferred forms of my invention, I contemplate that various changes and modifications can be made without departing from the scope of the invention as indicated by the claims.

I claim:

1. A piston ring comprising a ring body generally of channel-shape in cross section providing a peripheral groove bounded by an upper and a lower flange, said upper flange being thicker than said lower flange, said body having end faces normal to the axis of the opening formed by the ring and extending from the inside of the ring to the periphery thereof, said body having a wall at the base of the groove inclined upwardly and outwardly from and extending from the lower to the upper flange, said body having drainage ports spaced circumferentially thereof extending from said groove to the inner side of the ring.

2. A piston ring as defined in claim 1 in which said drainage ports extend partially through said lower flange.

3. A piston ring comprising a ring body generally of channel-shape in cross section providing a peripheral groove bounded by an upper and a lower flange, said body having a frustro-conical wall at the base of said groove, said body having drainage ports spaced circumferentially thereof extending from said groove to the inner side of the ring, said ring body being split with the flanges thereof each circumferentially continuous from end to end of the ring body.

4. A piston ring comprising a ring body generally of channel-shape in cross section providing a peripheral groove bounded by an upper and a lower flange, the peripheries of said flanges and the inner surface of said ring being substantially cylindrical, said body having a wall at the base of the groove inclined upwardly and outwardly from the lower to the upper flange, said body having drainage ports spaced circumferentially thereof extending from said groove to the inner side of the ring, said ring body being split with the flanges thereof each circumferentially continuous from end to end of the ring body.

5. A piston ring as defined in claim 4 in which said drainage ports extend partially through said lower flange.

6. A piston ring as defined in claim 4 in which said drainage ports extend partially through said lower flange and in which said upper flange is thicker than said lower flange.

7. A piston ring comprising a ring body generally of channel-shape in cross section providing a peripheral groove bounded by an upper and a lower flange, said body having a wall at the base of the groove inclined upwardly and outwardly from and extending from the lower to the upper flange, said body having drainage ports spaced circumferentially thereof extending from said groove to the inner side of the ring, said ports being spaced a distance substantially equal to the circumferential length of a port, said ring body being split with the flanges thereof each circumferentially continuous from end to end of the ring body.

8. A piston ring comprising a ring body generally of channel shape in cross section providing a peripheral groove bounded by an upper and a lower flange, said body having end faces normal to the axis of the opening formed by the ring and extending from the inside of the ring to the periphery thereof, said body having a wall at the base of the groove inclined upwardly and outwardly from and extending from the lower to the upper flange, said body having drainage ports spaced circumferentially thereof extending from said groove to the inner side of the ring, said ring being split, said ring body being split with the flanges thereof each circumferentially continuous from end to end of the ring body.

9. A piston ring as set forth in claim 8 in which said drainage ports extend partially through said lower flange.

References Cited in the file of this patent

UNITED STATES PATENTS

| 1,999,233 | Fall | Apr. 30, 1935 |
| 2,428,491 | Grant | Oct. 7, 1947 |
| 2,604,367 | Norton | July 22, 1952 |